United States Patent
Walecki et al.

(10) Patent No.: US 10,655,949 B2
(45) Date of Patent: May 19, 2020

(54) INSPECTING A MULTILAYER SAMPLE

(71) Applicant: Applejack 199 L.P., Milpitas, CA (US)

(72) Inventors: Wojciech Jan Walecki, Sunrise, FL (US); Alexander Pravdivtsev, Hamilton (CA)

(73) Assignee: APPLEJACK 199 L.P., Milpitas, CA (US)

( * ) Notice: Subject to any disclaimer, the term of this patent is extended or adjusted under 35 U.S.C. 154(b) by 0 days.

(21) Appl. No.: 16/174,053

(22) Filed: Oct. 29, 2018

(65) Prior Publication Data
US 2019/0120611 A1    Apr. 25, 2019

Related U.S. Application Data

(63) Continuation of application No. 15/486,146, filed on Apr. 12, 2017, now Pat. No. 10,113,860.

(51) Int. Cl.
*G01B 11/06* (2006.01)
*G01B 9/02* (2006.01)

(52) U.S. Cl.
CPC ........ *G01B 11/0675* (2013.01); *G01B 9/0209* (2013.01); *G01B 9/02017* (2013.01); *G01B 9/02021* (2013.01); *G01B 9/02041* (2013.01); *G01B 9/02044* (2013.01); *G01B 9/02078* (2013.01); *G01B 11/0683* (2013.01); *G01B 2210/56* (2013.01); *G01B 2290/25* (2013.01)

(58) Field of Classification Search
CPC . G01B 11/06; G01B 11/0616; G01B 11/0675; G01B 9/0209; G01J 3/45
See application file for complete search history.

(56) References Cited

U.S. PATENT DOCUMENTS

| | | | |
|---|---|---|---|
| 5,270,789 A | * | 12/1993 | Falco ............... G01D 5/266 356/480 |
| 7,116,429 B1 | | 10/2006 | Walecki et al. |
| 7,502,121 B1 | | 3/2009 | Walecki et al. |
| 10,113,860 B1 | * | 10/2018 | Walecki ............ G01B 11/0675 |

(Continued)

OTHER PUBLICATIONS

U.S. Appl. No. 15/410,328, titled Inspecting a Slab of Material:, filed Jan. 19, 2017, 46 pages.

(Continued)

*Primary Examiner* — Jonathan M Hansen
(74) *Attorney, Agent, or Firm* — Maschoff Brennan

(57) ABSTRACT

Inspecting a multilayer sample. In one example embodiment, a method may receiving, at a beam splitter, light and splitting the light into first and second portions; combining, at the beam splitter, the first portion of the light after being reflected from a multilayer sample and the second portion of the light after being reflected from a reflector; receiving, at a computer-controlled system for analyzing Fabry-Perot fringes, the combined light and spectrally analyzing the combined light to determine a value of a total power impinging a slit of the system for analyzing Fabry-Perot fringes; determining an optical path difference (OPD); recording an interferogram that plots the value versus the OPD for the OPD; performing the previous acts of the method one or more additional times with a different OPD; and using the interferogram for each of the different OPDs to determine the thicknesses and order of the layers of the multilayer sample.

19 Claims, 9 Drawing Sheets

(56) References Cited

U.S. PATENT DOCUMENTS

| | | | | |
|---|---|---|---|---|
| 2005/0264808 A1* | 12/2005 | Wang | ............... | G01J 3/1256 |
| | | | | 356/328 |
| 2008/0049233 A1* | 2/2008 | De Groot | ......... | G01B 9/02044 |
| | | | | 356/511 |
| 2010/0007894 A1* | 1/2010 | Suehira | ............. | A61B 3/1005 |
| | | | | 356/497 |
| 2010/0161273 A1* | 6/2010 | Mansfield | ............. | G01B 9/04 |
| | | | | 702/167 |
| 2012/0044501 A1 | 2/2012 | Oikaze et al. | | |

OTHER PUBLICATIONS

Liu, N., Dai, C., Tang, Y. and Xi, P., 2014. Virtual-OCT: A simulated optical coherence tomography instrument. Journal of Innovative Optical Health Sciences, 7(05), p. 1450030.

Stiffer, D., 2007. Beyond biomedicine: a review of alternative applications and developments for optical coherence tomography. Applied Physics B, 88(3), pp. 337-357.

Walecki, Wojciech J., et al. "Low-coherence interferometric absolute distance gauge for study of MEMS structures." MOEMS-MEMS Micro & Nanofabrication. International Society for Optics and Photonics, 2005.

Walecki, W.J., Pravdivtsev, A., Lai, K, Santos II, M. and Koo, A., Aug. 2005, Synchronized low coherence Interferometry for in-situ and ex-situ metrology for semiconductor manufacturing. In Optics & Photonics 2005 (pp. 58800H-58800H). International Society for Optics and Photonics.

* cited by examiner

INSPECTING A MULTILAYER SAMPLE

CROSS-REFERENCE TO RELATED APPLICATION

This application is a continuation of U.S. patent application Ser. No. 15/486,146, filed on Apr. 12, 2017, the disclosure of which is incorporated herein by reference in its entirety.

FIELD

The embodiments discussed in this disclosure relate to inspecting a multilayer sample.

BACKGROUND

During an automated manufacturing process, a multilayer sample of material, such as a multilayer wafer, may be inspected using conventional inspection systems to determine the overall thickness of the multilayer sample and to determine thicknesses of the various layers. During the automated manufacturing process, while the composition of each of the layers is often known, the order of the layers, and the corresponding orientation of the layers, is often unknown.

For example, during an automated manufacturing process, a multilayer wafer may have a silicon layer and a silicon dioxide layer, and the multilayer wafer may need to be oriented with the silicon layer on top to allow the silicon layer to be ground down during the automated manufacturing process to a specific thickness. Therefore, a conventional inspection system may be positioned above the multilayer wafer to inspect the multilayer wafer as it travels through the automated manufacturing process in order to measure the thickness of the top silicon layer to verify that the silicon layer is successfully ground down to the specific thickness. In this example, however, the multilayer wafer may inadvertently become turned upside down during the automated manufacturing process such that the silicon layer, which should be on the top to be exposed for grinding down, ends up on the bottom. While the conventional inspection system may be able to determine that the multilayer wafer has a top layer and a bottom layer, and may be able to determine the thicknesses of the top layer and the bottom layer, the conventional inspection system may be unable to determine which of the top and bottom layers is the silicon layer and which is the silicon dioxide layer.

In another example, during an automated silicon wafer thinning and packaging process, the detailed structure of a multilayer wafer may be unknown. In this automated process, identifying a remaining silicon thickness may involve determining a thickness of: the lowest layer of the structure if the multilayer wafer resides on grinding tape, the second-lowest layer if the multilayer wafer resides on dicing tape, or the third-lowest layer if the multilayer wafer resides on Die Attachment Film (DAF) tape attached to dicing tape. The exact thickness of the remaining silicon may be an important parameter for heat transfer in modern semiconductor devices. While a conventional inspection system may be able to determine that the multilayer wafer has multiple layers, and may be able to determine the thicknesses of the layers, the conventional inspection system may be unable to determine the compositions and order of the layers. For example, a conventional inspection system may be unable to determine the thickness of a particular layer of a multilayer wafer, such as the layer that is intended to be the lowest layer of the multilayer wafer.

Therefore, conventional inspection systems may be unable to correctly identify differences in the compositions of different layers of a multilayer sample during an automated manufacturing process. This inability of conventional inspection systems may be result in undetected problems with the order of the layers in a multilayer sample, and the corresponding orientation of the layers, such as undetected upside-down multilayer samples, resulting in manufacturing defects during the automated manufacturing process.

The subject matter claimed in this disclosure is not limited to embodiments that solve any disadvantages or that operate only in environments such as those described above. Rather, this background is only provided to illustrate one example technology area where some embodiments described in this disclosure may be practiced.

SUMMARY

One example embodiment may include a method for inspecting a multilayer sample. The method may include emitting, from a broadband light source, light over single mode optical fiber. The method may also include receiving, at a beam splitter, the light and splitting, at the beam splitter, the light into first and second portions. The method may further include directing, from the beam splitter, the first portion of the light toward a multilayer sample positioned a first optical distance from the beam splitter. The method may also include directing, from the beam splitter, the second portion of the light onto a reflector positioned a second optical distance from the beam splitter. The method may further include combining, at the beam splitter, the first portion of the light after being reflected from the multilayer sample and the second portion of the light after being reflected from the reflector. The method may also include directing, from the beam splitter, the combined light over the optical fiber. The method may further include receiving, at a computer-controlled system for analyzing Fabry-Perot fringes, the combined light over the optical fiber and spectrally analyzing the combined light using the system for analyzing Fabry-Perot fringes to determine a value of a total power impinging a slit of the system for analyzing Fabry-Perot fringes. The method may also include determining an optical path difference (OPD) between an optical path of the first portion of the light and an optical path of the second portion of the light. The method may further include recording an interferogram that plots the value versus the OPD for the OPD. The method may also include performing the previous acts of the method one or more additional times after decreasing the first optical distance by moving the multilayer sample closer to the beam splitter, or after increasing the second optical distance by moving the reflector further away from the beam splitter, resulting in a different OPD. The method may further include using the interferogram for each of the different OPDs to determine the thicknesses and order of the layers of the multilayer sample.

In some embodiments, the method may further include receiving, at a directional element, the light from the broadband light source over the optical fiber and directing, from the directional element, the light to the beam splitter over the optical fiber. In some embodiments, the method may also include receiving, at the directional element, the combined light from the beam splitter and directing, from the directional element, the combined light to using the system for analyzing Fabry-Perot fringes. In some embodiments, the method may further include positioning the multilayer sample so that the first optical distance is shorter than the second optical distance by more than a coherence of the light emitted by the broadband light source. In some embodiments, the spectrally analyzing of the combined light at the system for analyzing Fabry-Perot fringes may be performed over all channels of the system for analyzing Fabry-Perot fringes. In some embodiments, the first optical distance may be decreased by an increment smaller than half of a wavelength of the first portion of the light. In some embodiments, the performing of the previous acts of the method may continue until the OPD is less than an anticipated optical thickness of the multilayer sample. In some embodiments, the method may further include positioning the multilayer sample so that the first optical distance is longer than the second optical distance by more than a coherence of the light emitted by the broadband light source.

Another embodiment may include a system for inspecting a multilayer sample. The system may include single mode optical fiber, a broadband light source, a beam splitter, a system for analyzing Fabry-Perot fringes, a motion stage, and a computer. The broadband light source may be configured to emit light over the optical fiber. The beam splitter may be configured to receive the light from the broadband light source and split the light into first and second portions, direct the first portion of the light toward a multilayer sample positioned a first optical distance from the beam splitter, direct the second portion of the light onto a reflector positioned a second optical distance from the beam splitter, combine the first portion of the light after being reflected from the multilayer sample and the second portion of the light after being reflected from the reflector, and direct the combined light over the optical fiber. The system for analyzing Fabry-Perot fringes may be configured to receive the combined light over the optical fiber and to spectrally analyze the combined light to measure a value of a total power impinging a slit of the system for analyzing Fabry-Perot fringes. The motion stage may be configured to decrease the first optical distance by moving the multilayer sample closer to the beam splitter or increase the second optical distance by moving the reflector further away from the beam splitter. The computer may be configured to control the system for analyzing Fabry-Perot fringes, determine an optical path difference (OPD) between an optical path of the first portion of the light and an optical path of the second portion of the light, record an interferogram that plots the value versus the OPD for each unique OPD, control the motion stage between measurements to change the OPD, and use the interferograms to determine the thicknesses and order of the layers of the multilayer sample.

In some embodiments, the system further includes a directional element configured to receive the light from the broadband light source over the optical fiber, direct the light to the beam splitter over the optical fiber, receive the combined light from the beam splitter, and direct the combined light to the system for analyzing Fabry-Perot fringes. In some embodiments, the system also includes a point detector configured to be employed when the system is operating in a Michelson interferometer mode and an optical switch configured to switch the combined light directed from directional element back and forth between the system for analyzing Fabry-Perot fringes and the point detector. In some embodiments, the system for analyzing Fabry-Perot fringes is configured to spectrally analyze the combined light over all channels of the system for analyzing Fabry-Perot fringes. In some embodiments, the computer may be configured to control the motion stage between measurements to only change the OPD by an increment smaller than half of a wavelength of the first portion of the light. In some embodiments, the computer may be configured to control the motion stage between measurements to change the OPD only until the OPD is less than an anticipated optical thickness of the multilayer sample.

It is to be understood that both the foregoing summary and the following detailed description are explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 2:
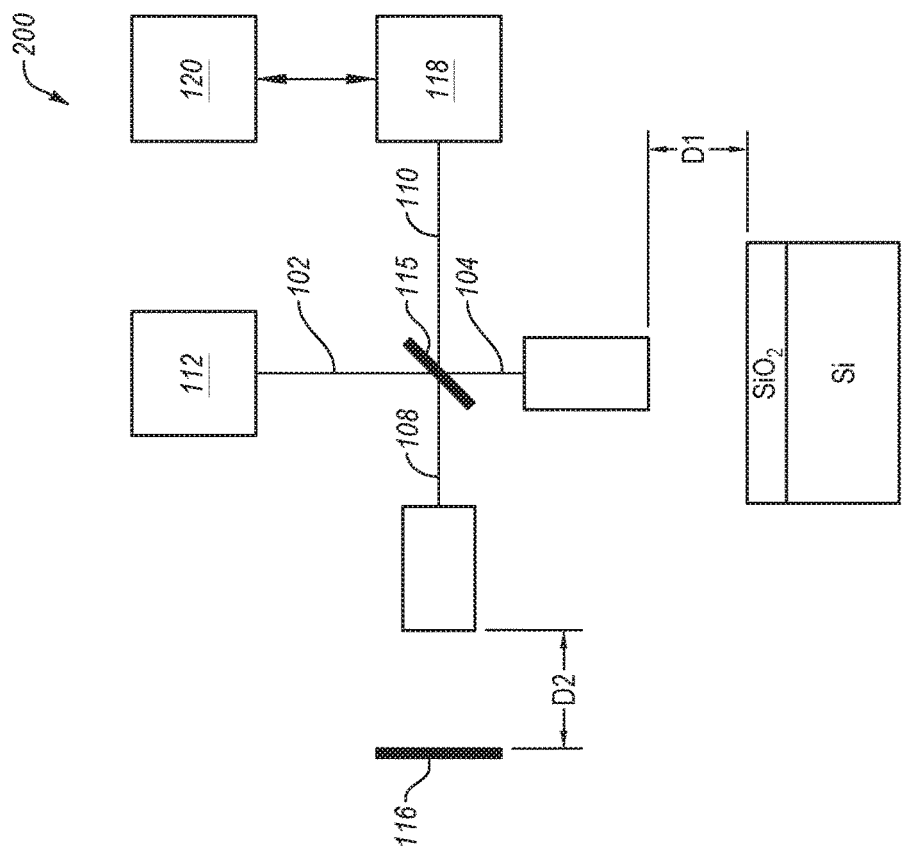
FIG. 2 illustrates a second example system for inspecting a multilayer sample.

Unlike convention inspection systems, the embodiments disclosed herein may be able to correctly determine both the thicknesses and the order of the layers of a multilayer sample.

For example, during an automated manufacturing process, a multilayer wafer may have a silicon layer and a silicon dioxide layer, and the multilayer wafer may need to be oriented with the silicon layer on top to allow the silicon layer to be ground down during the automated manufacturing process to a specific thickness. The embodiments disclosed herein may be positioned above the multilayer wafer to inspect the multilayer wafer as it travels through the automated manufacturing process in order to measure the thickness of the top silicon layer to verify that the silicon layer is successfully ground down to the specific thickness. In this example, the multilayer wafer may inadvertently become turned upside down during the automated manufacturing process such that the silicon layer, which should be on the top to be exposed for grinding down, ends up on the bottom. The embodiments disclosed herein may be able to determine that the multilayer wafer has a top layer and a bottom layer, may be able to determine the thicknesses of the top layer and the bottom layer, and may be able to determine that the top layer is the silicon dioxide and the bottom layer is the silicon layer. Therefore, in this situation where the multilayer wafer inadvertently becomes turned upside down during the automated manufacturing process, the embodiments disclosed herein may be able to determine that there is a problem, which may avoid the silicon dioxide layer of the multilayer wafer being improperly ground down.

In another example, the use of systems that determine wafer thickness using spectral Fabry-Perot fringe analysis may measure only intensity of reflected radiation and may lose information about the change of the phase of the radiation during the reflection process. In contrast, interferometers may retain this phase information. Thus, interferograms collected by interferometers, such as Michelson interferometers, may contain more information than the intensity spectra. Therefore, embodiments disclosed herein may be employed to utilize a system that determines wafer thickness using spectral Fabry-Perot fringe analysis equipped with an additional reference mirror in order to collect interferograms.

Therefore, the embodiments disclosed herein may be able to correctly identify differences in the compositions of different layers of a multilayer sample during an automated manufacturing process. This ability of the embodiments disclosed herein may be result in the detection of problems with the order of the layers in a multilayer sample, and the corresponding orientation of the layers, such as an upside-down multilayer samples, thereby avoiding manufacturing defects during the automated manufacturing process.

Embodiments of the present disclosure will be explained with reference to the accompanying drawings.

Figure 1:
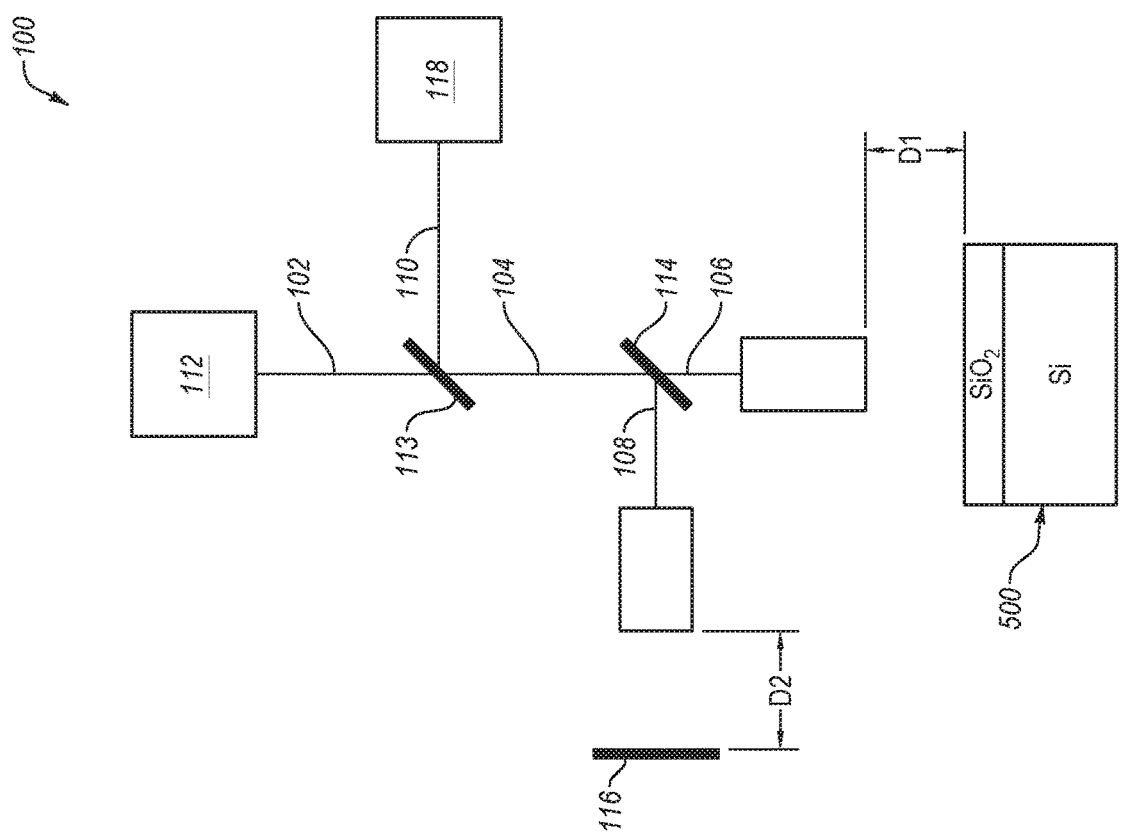
FIG. 1 illustrates a first example system for inspecting a multilayer sample.

FIG. 1 illustrates a first example system 100 for inspecting a multilayer sample 500, arranged in accordance with at least some embodiments described in this disclosure. In general, the system 100 may be configured to inspect the multilayer sample 500 to correctly determine the number of layers, the thickness of each layer, the composition of each layer, the order of the layers, and the corresponding orientation of the layers. To perform the inspection, the system 100 may include single mode optical fibers 102-110, a broadband light source 112, a direction element 113, a beam splitter 114, a reflector 116, a system 118 for analyzing Fabry-Perot fringes and a computer 120.

In some embodiments, the broadband light source 112 may be configured to emit light over the optical fiber 102.

In some embodiments, the directional element 113 may be configured to receive the light from the broadband light source 112 and direct the light over the optical fiber 104 to the beam splitter 114.

In some embodiments, the beam splitter 114 may be configured to receive the light from the directional element 113 and split the light into first and second portions. The beam splitter 114 may also be configured to direct the first portion of the light over the optical fiber 106 toward the multilayer sample 500 positioned a first optical distance D1 from the beam splitter 114. The beam splitter 114 may further be configured to direct the second portion of the light over the optical fiber 108 onto the reflector 116 positioned a second optical distance D2 from the beam splitter 114. The beam splitter 114 may also be configured to combine the first portion of the light after being reflected from the multilayer sample 500 and the second portion of the light after being reflected from the reflector 116. The beam splitter 114 may further be configured direct the combined light over the optical fiber 104 back toward the directional element 113.

In some embodiments, the directional element 113 may be configured to receive the combined light from the beam splitter 114 and direct the combined light over the optical fiber 110 toward the system 118 for analyzing Fabry-Perot fringes.

In some embodiments, the system 118 for analyzing Fabry-Perot fringes may be configured to receive the combined light over the optical fiber 110. The system 118 for analyzing Fabry-Perot fringes may be further configured to spectrally analyze the combined light to measure a value of a total power impinging a slit of the system 118 for analyzing Fabry-Perot fringes. In some embodiments, the system 118 for analyzing Fabry-Perot fringes may be configured to spectrally analyze the combined light over all channels of the system 118 for analyzing Fabry-Perot fringes. In some embodiments, the system 118 for analyzing Fabry-Perot fringes may include spectrometer. In some embodiments, the system 118 for analyzing Fabry-Perot fringes may include a spectrometer combined with an etalon filter. An example of system 118 for analyzing Fabry-Perot fringes that combines a spectrometer with an etalon filter is disclosed in U.S. patent application Ser. No. 15/410,328, filed Jan. 19, 2017, which is incorporated herein by reference in its entirety.

In some embodiments, the system 100 may further include one or more motion stages (not shown) configured to reposition the reflector 116 and/or the multilayer sample 500 closer to, or further away from, the beam splitter 114. In some embodiments, the one or more motion stages may be configured to decrease the first optical distance D1 by moving the multilayer sample closer 500 to the beam splitter 114. In some embodiments, the one or more motion stages may be configured to increase the second optical distance D2 by moving the reflector 116 further away from the beam splitter 114. In some embodiments the one or more motion stages may be configured to both decrease the first optical distance D1 by moving the multilayer sample 500 closer to the beam splitter 114 as well as increase the second optical distance D2 by moving the reflector 116 further away from the beam splitter 114. In some embodiments, the system 100 may allow measurement of the first optical distance D1 and may be used to measure the topography, bow, and warp of the multilayer sample 500.

In some embodiments, the computer 120 may be configured to control the system 118 for analyzing Fabry-Perot fringes, determine an optical path difference (OPD) between an optical path of the first portion of the light and an optical path of the second portion of the light, record an interferogram that plots the value versus the OPD for each unique OPD, control the motion stage between measurements to change the OPD, and use the interferograms to determine the thicknesses and order of the layers of the multilayer sample 500. In some embodiments, the computer 120 may be configured to control the one or more motion stages between measurements to only change the OPD by an increments smaller than half of a wavelength of the first portion of the light. In some embodiments, the computer may be configured to control the motion stage between measurements to change the OPD by an increment equal to or larger than half of a wavelength of the first portion of the light. In some embodiments, the computer 120 may be configured to control the one or more motion stages between measurements to change the OPD only until the OPD is less than an anticipated optical thickness of the multilayer sample 500.

In some embodiments, the computer 120 may include a processor and a memory. The processor may include, for example, a microprocessor, microcontroller, digital signal processor (DSP), application-specific integrated circuit (ASIC), a Field-Programmable Gate Array (FPGA), or any other digital or analog circuitry configured to interpret and/or to execute program instructions and/or to process data. In some embodiments, the processor may interpret and/or execute program instructions and/or process data stored in the memory. The processor may execute instructions to perform operations with respect to the system 118 for analyzing Fabry-Perot fringes and the one or more motion stages in order to determine the thicknesses and order of the layers of the multilayer sample 500. The memory may include any suitable computer-readable media configured to retain program instructions and/or data for a period of time. By way of example, and not limitation, such computer-readable media may include tangible and/or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media. Computer-executable instructions may include, for example, instructions and data that cause a general-purpose computer, special-purpose computer, or special-purpose processing device to perform a certain function or group of functions.

The system 100 may be advantageously employed to inspect the multilayer sample 500 to correctly determine the number of layers, the thickness of each layer, the composition of each layer, the order of the layers, and the corresponding orientation of the layers. The system 100 may be advantageously employed in a variety of environment, such as automated manufacturing process. For example, where the multilayer sample 500 includes a silicon layer and a silicon dioxide layer, and where it is important that the silicon layer be on top, the system 100 may be able to detect that the multilayer sample 500 is upside down as disclosed in FIG. 1, and thereby halt the automated manufacturing process until the orientation of the multilayer sample 500 is corrected in order to avoiding manufacturing defects during the automated manufacturing process.

FIG. 2 illustrates a second example system 200 for inspecting the multilayer sample 500, arranged in accordance with at least some embodiments described in this disclosure. The system 200 of FIG. 2 is similar to the system 100 of FIG. 1, except that the system 200 eliminates the directional element 113, the beam splitter 114, and the optical fiber 104, and replaces these three components with a beam splitter/directional element 115. The beam splitter/directional element 115 of FIG. 2 combines the functionality of the directional element 113 and the beam splitter 114 of FIG. 1. Otherwise, the system 200 of FIG. 2 functions similarly to the system 100 of FIG. 1.

Figure 3:
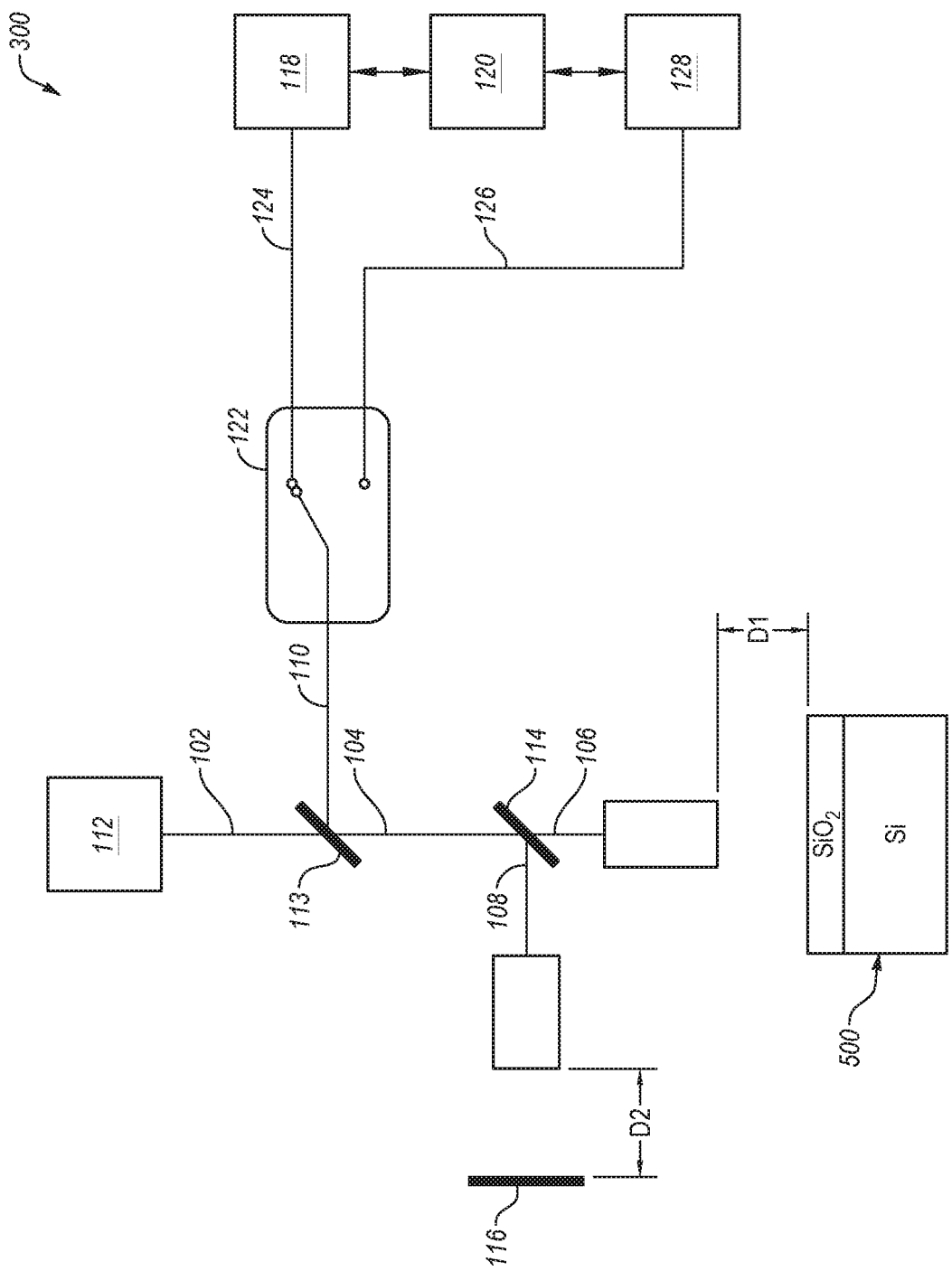
FIG. 3 illustrates a third example system for inspecting a multilayer sample.

FIG. 3 illustrates a third example system 300 for inspecting the multilayer sample 500, arranged in accordance with at least some embodiments described in this disclosure. The system 300 of FIG. 3 is similar to the system 100 of FIG. 1, except that the system 300 adds an optical switch 122, optical fibers 124 and 126, and a point detector 128.

In some embodiments, the optical switch 122 may be controlled by the computer 120 and may be configured to switch the combined light directed from directional element 113 over the optical fiber 110 back and forth between the system 118 for analyzing Fabry-Perot fringes, over the optical fiber 124, and the point detector 128, over the optical fiber 126. The point detector 128 may be configured to be employed when the system 300 is operating in a Michelson interferometer mode, and may be controlled by the computer 120 in a similar manner as the system 118 for analyzing Fabry-Perot fringes is controlled by the computer 120.

For example, one may observe multiple reflections of light in single-layer and multilayer samples manifested in multiple interference peaks in Michelson interferograms. These reflections may be caused by multiple light reflections from various sample interfaces. Light may be reflected back and forth several times inside the sample before the light leaves the sample. These multiple scattering (reflection) paths may cause complications during Michelson interferogram analysis. By combining a Michelson interferometer with a Fabry-Perot interferometer, the analysis can be made easier. Fabry-Perot interferograms may help to determine the thicknesses of various layers residing in the samples faster and more accurately, while Michelson interferograms may help to determine their order (or sequence) relative to a probe head. An interferogram may contain more information about a sample since it contains information about phase and magnitude of the reflected electromagnetic wave from the sample, while the reflected spectrum intensity may only contain information about amplitude of the reflected radiation.

Figure 4:
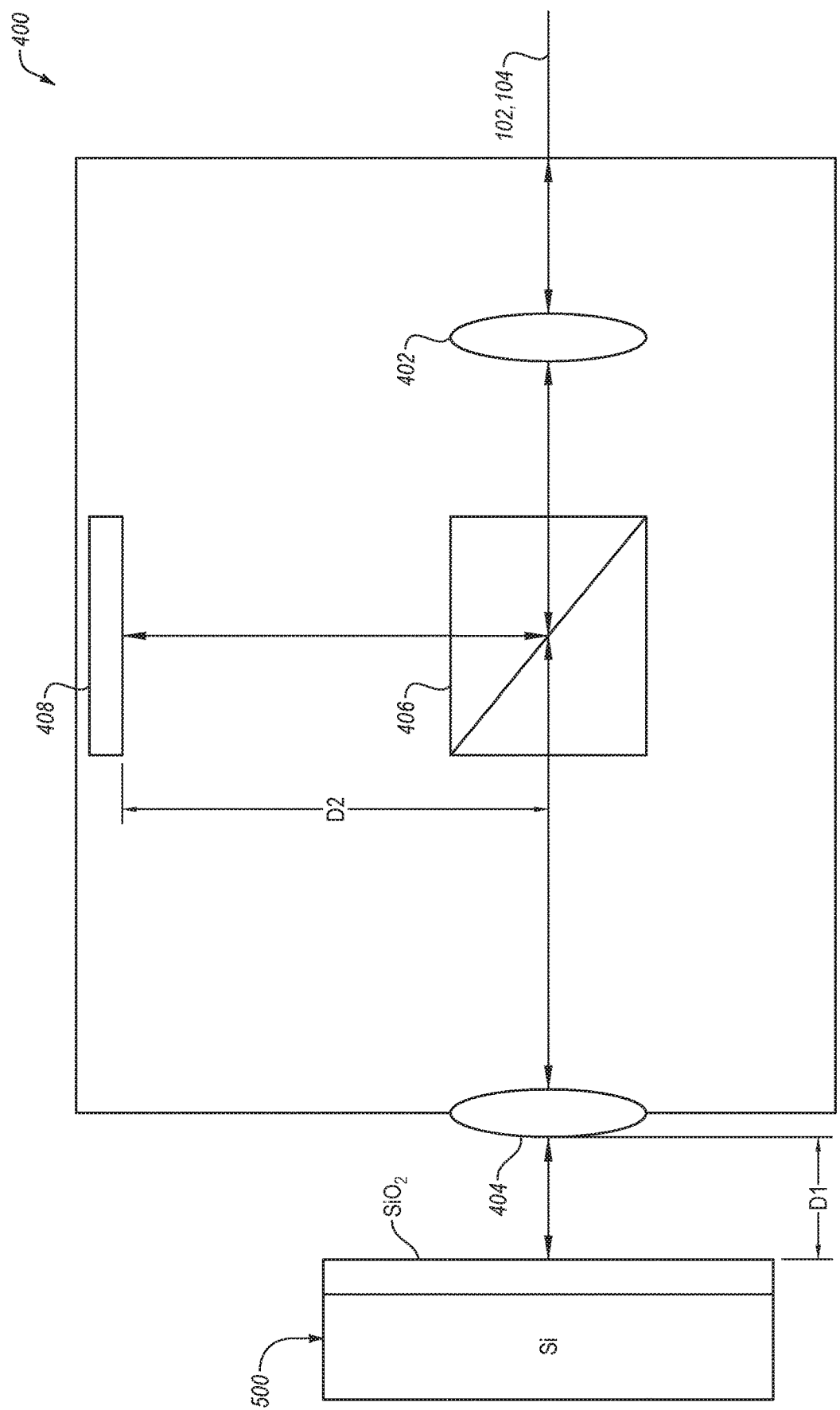
FIG. 4 illustrates an example beam assembly that may be employed in the systems of FIGS. 1-3.

FIG. 4 illustrates an example beam assembly 400 that may be employed in the systems 100, 200, and 300 of FIGS. 1-3, arranged in accordance with at least some embodiments described in this disclosure. In particular, the beam assembly 400 may be employed in place of the beam splitter 114 and optical fibers 106 and 108 in the systems 100 and 300 of FIGS. 1 and 3, and may be employed in place of the beam splitter functionality of the beam splitter/directional element 115 and the optical fibers 106 and 108 of the system 200 of FIG. 2.

In some embodiments, the beam assembly 400 may include lenses 402 and 404. The beam assembly 400 may also include a beam splitter 406 and a reflector 408. The lens 402 may be configured to receiving the light over the optical fiber 102 or 104 and collimate and direct the light toward the beam splitter 406. The beam splitter 406 may be configured to split the light from the lens 402 into first and second portions, direct the first portion of the light toward the lens 404, and direct the second portion of the light onto the reflector 408. The lens 404 may be configured to receive the first portion of the light from the beam splitter 406, direct the first portion of the light toward the multilayer sample 500, and direct the first portion of the light after being reflected from the multilayer sample 500 back toward the beam splitter 406. Further, the reflector 408 may be configured to receive the second portion of the light from the beam splitter 406 and reflect the second portion of the light back toward the beam splitter 406. The beam splitter 406 may be further configured to combine the first portion of the light after being reflected from the multilayer sample 500 and the second portion of the light after being reflected from the reflector 408, and then direct the combined light toward the lens 402. Finally, the lens 402 may be configured to receive the combined light and direct the combined light over the optical fiber 102 or 104.

The beam assembly 400 may further include one or more motion stages (not shown) configured to reposition the reflector 408 and/or the multilayer sample 500 closer to, or further away from, the beam splitter 406, in order to adjust the optical distances D1 and D2, similarly to the one or more motion stages discussed above in connection with FIG. 1.

Figure 5B:
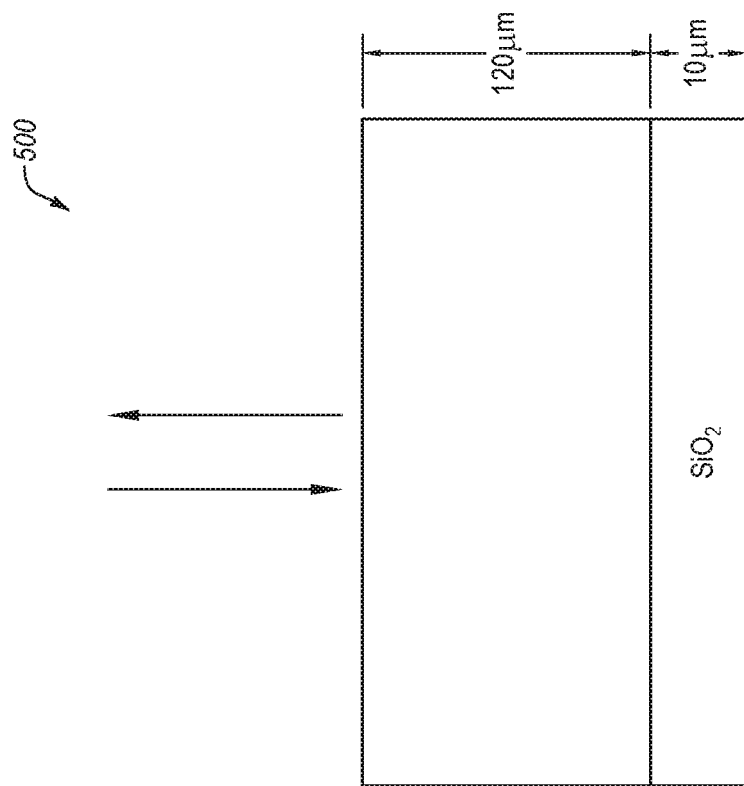
FIG. 5B illustrates the example multilayer sample of FIG. 5A oriented right side up.
Figure 5A:
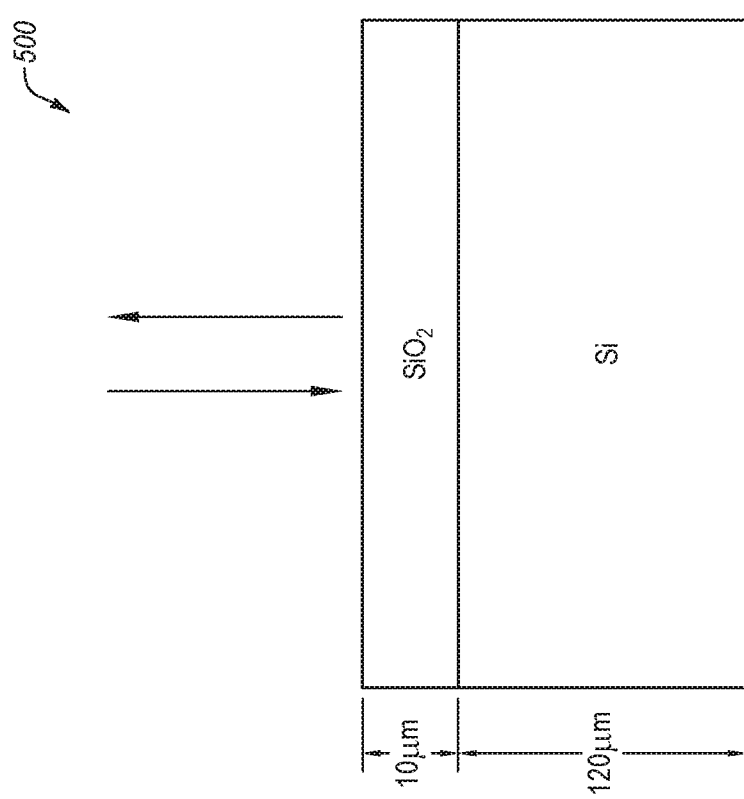
FIG. 5A illustrates an example multilayer sample oriented upside down.

FIG. 5A illustrates the example multilayer sample 500 oriented upside down and FIG. 5B illustrates the example multilayer sample 500 oriented right-side up. In some embodiments, the multilayer sample 500 may be involved in an automated manufacturing process where it is important that the silicon layer be on top. Therefore, in this scenario, the multilayer sample 500 of FIG. 5A is upside down and the multilayer sample 500 of FIG. 5B is right-side up. The systems 100, 200, and 300 disclosed herein may be employed to detect that the multilayer sample 500 of FIG. 5A is upside down, and may thereby avoid manufacturing defects during the automated manufacturing process by halting the automated manufacturing process until the orientation of the multilayer sample 500 is corrected as disclosed in FIG. 5B.

Figure 6A:
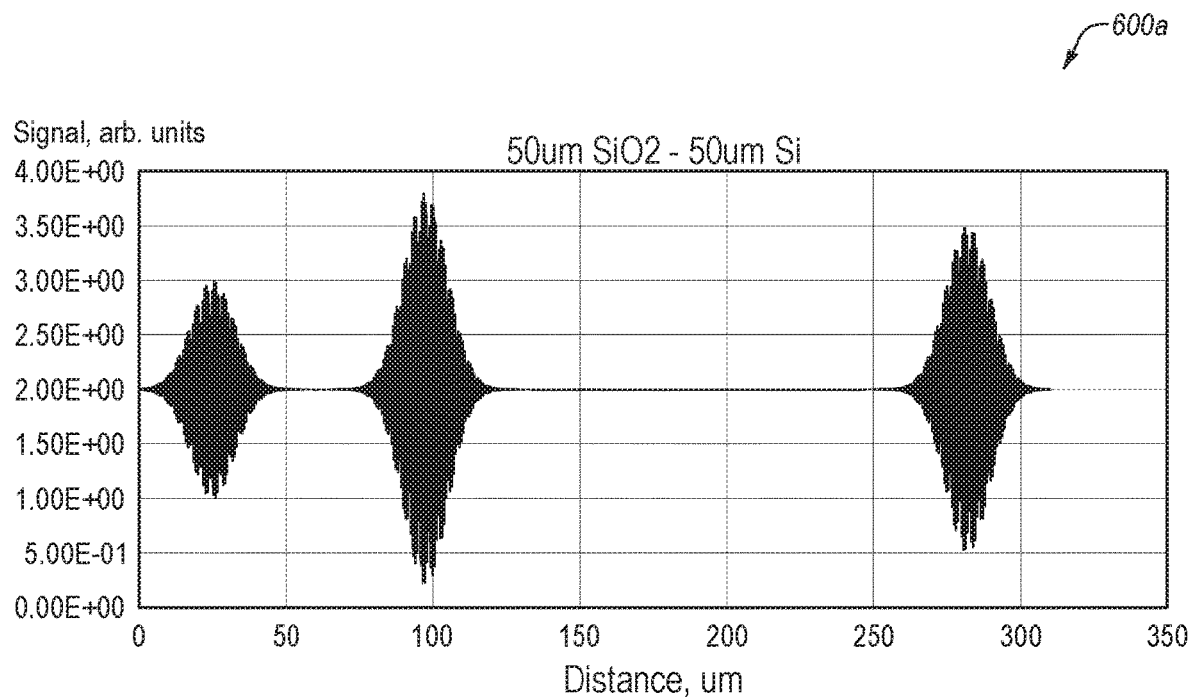
FIGS. 6A and 6B illustrate simulated Michelson interferograms of radiation that may be obtained by the systems of FIGS. 1-3 from the two example multilayer samples of FIGS. 5A and 5B, respectively.
Figure 6B:
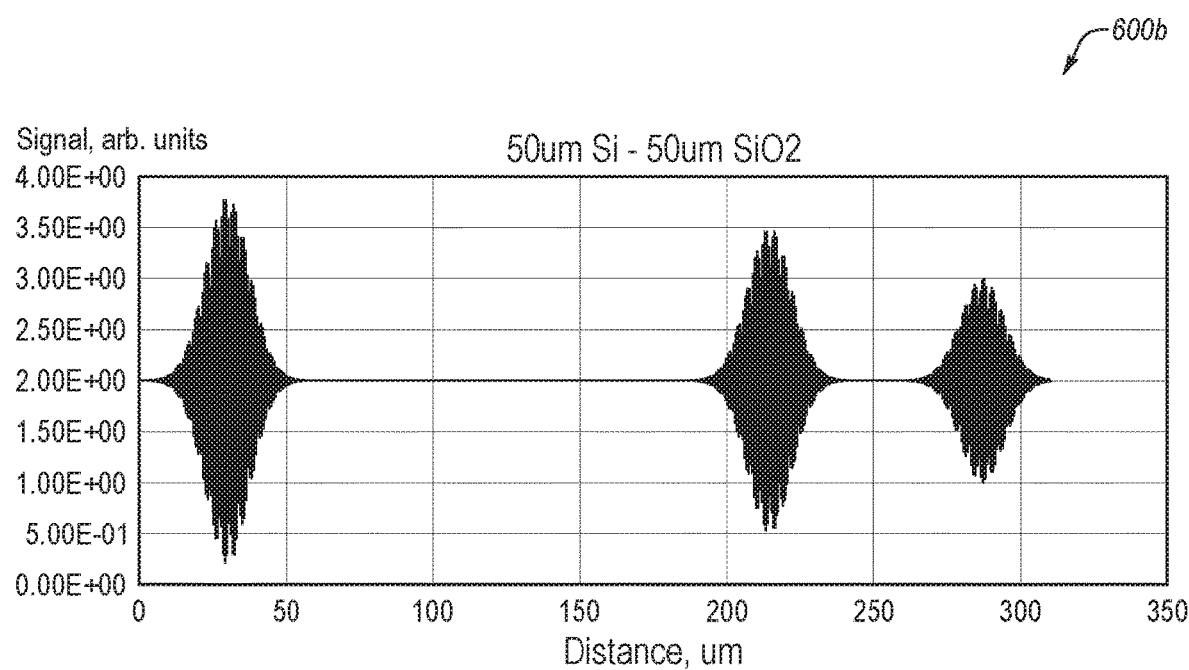
Figure 6C:
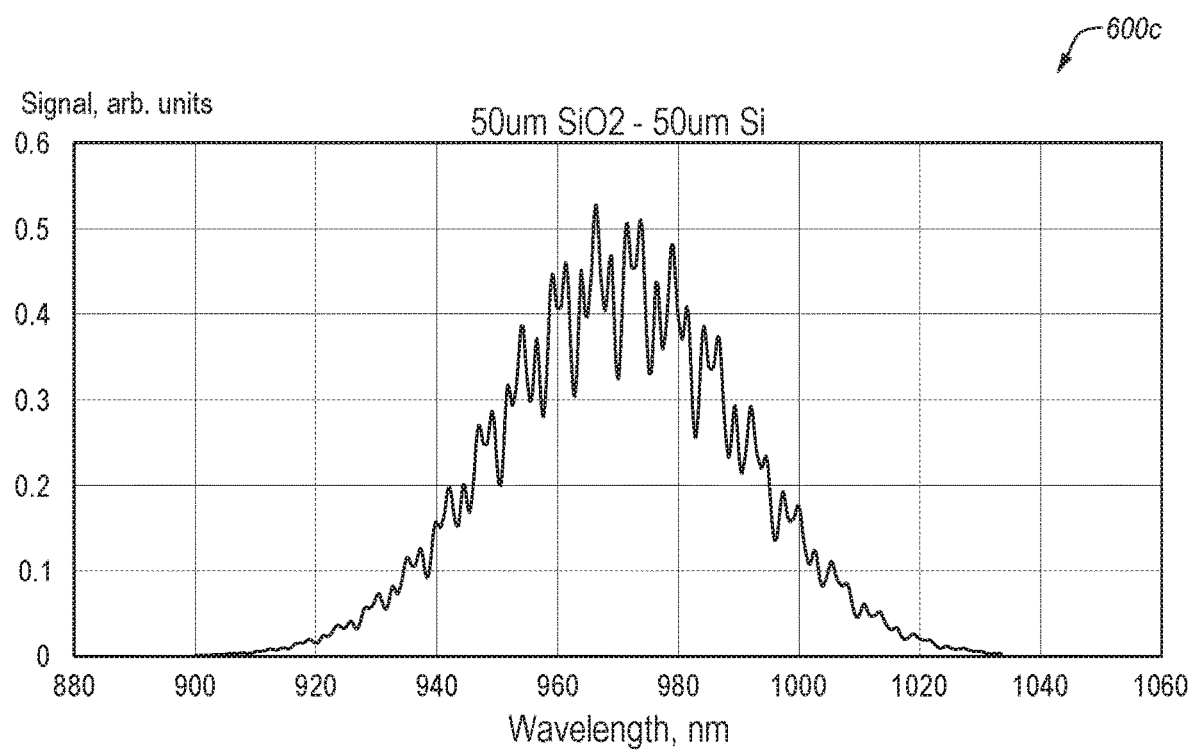
FIGS. 6C and 6D illustrate simulated Fabry-Perot fringes interferograms that may be obtained from the two example multilayer samples of FIGS. 5A and 5B, respectively.
Figure 6D:
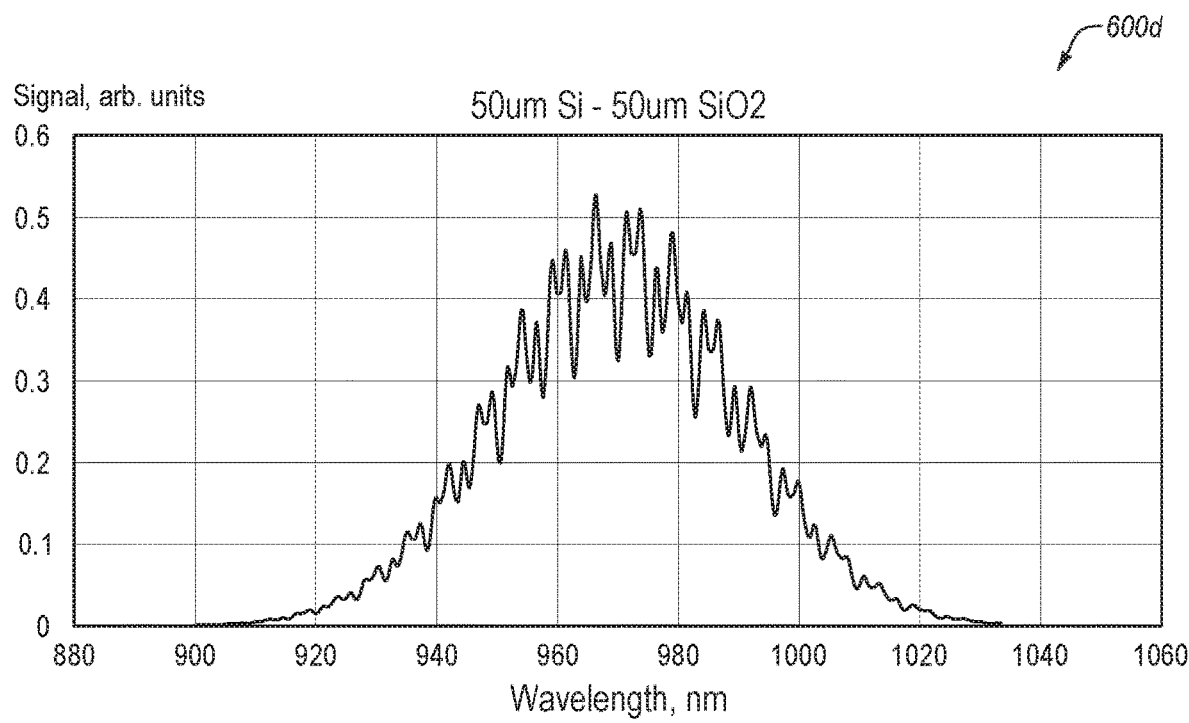

FIGS. 6A and 6B illustrate simulated Michelson interferograms 600a and 600b of radiation that may be obtained by the systems 100, 200, and 300 of FIGS. 1-3 from the two orientations of the multilayer sample 500 of FIGS. 5A and 5B, respectively. FIGS. 6C and 6D illustrate simulated Fabry-Perot fringes interferograms 600a and 600b that may be obtained from the two example multilayer samples of FIGS. 5A and 5B, respectively. In contrast to the simulated Fabry-Perot fringes interferograms 600c and 600d of FIGS. 6C and 6D which appear identical, the simulated Michelson interferograms 600a and 600b appear different. As disclosed in the simulated Michelson interferograms 600a and 600b, the systems 100, 200, and 300 of FIGS. 1-3 may be able to distinguish between the silicon layer being on the bottom (as indicated in the simulated Michelson interferogram 600a) and the silicon layer being on the bottom (as indicated in the simulated Michelson interferogram 600b). Additionally, due to multiple reflections in the simulated Michelson interferograms 600a and 600b, the simulated Fabry-Perot interferograms 600c and 600d may be employed to help define the number of layers in the multilayer sample 500, while the simulated Michelson interferograms 600a and 600b may be employed to help define the order of the layers relative to the system systems 100, 200, and 300 of FIGS. 1-3. Thus the thickness and order of the layers of the multilayer sample 500 of FIGS. 5A and 5B may be determined using the systems 100, 200, and 300 of FIGS. 1-3.

Figure 7A:
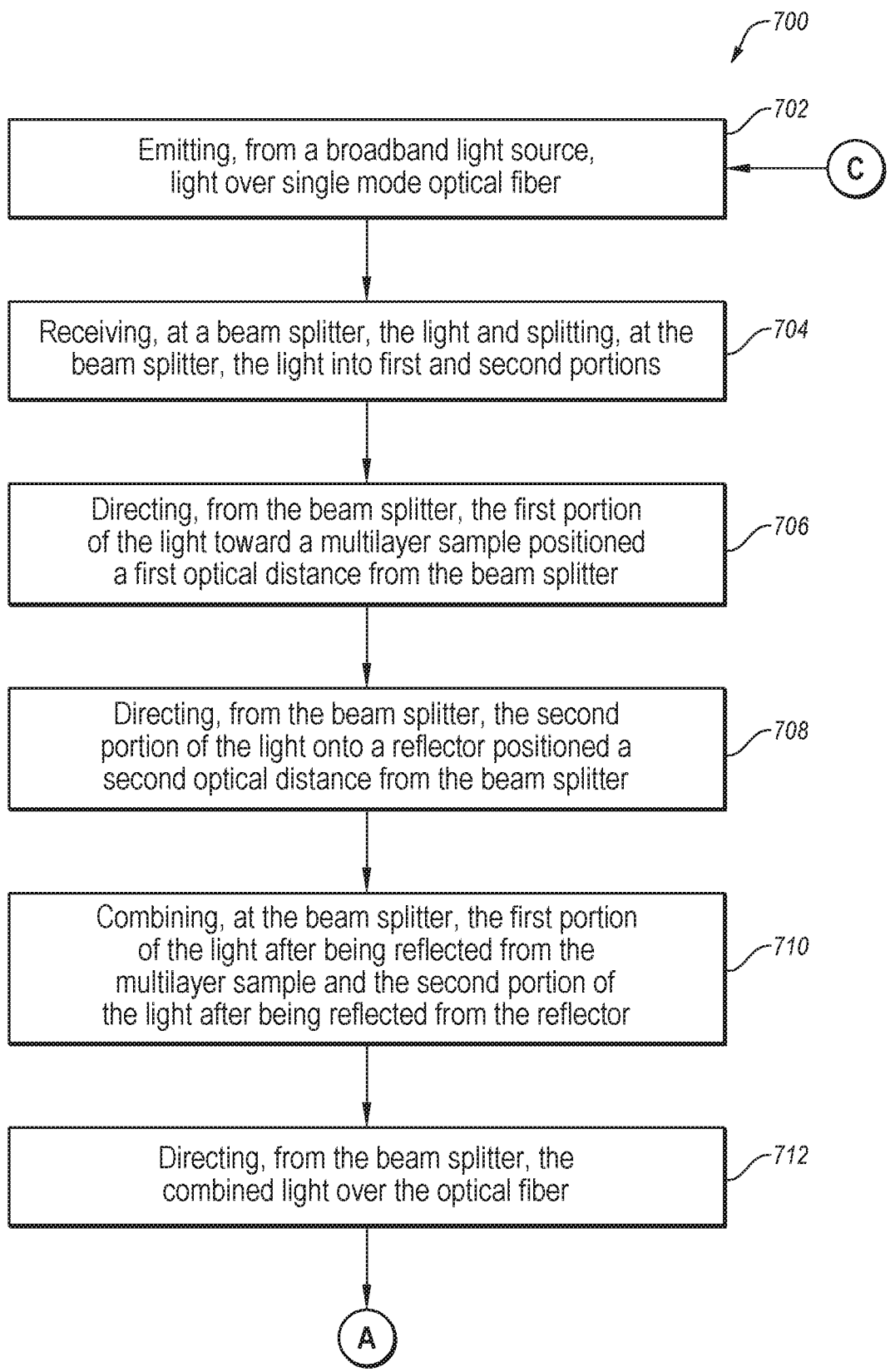
FIGS. 7A, 7B, and 7C illustrate a flowchart of an example method for inspecting a multilayer sample.
Figure 7B:
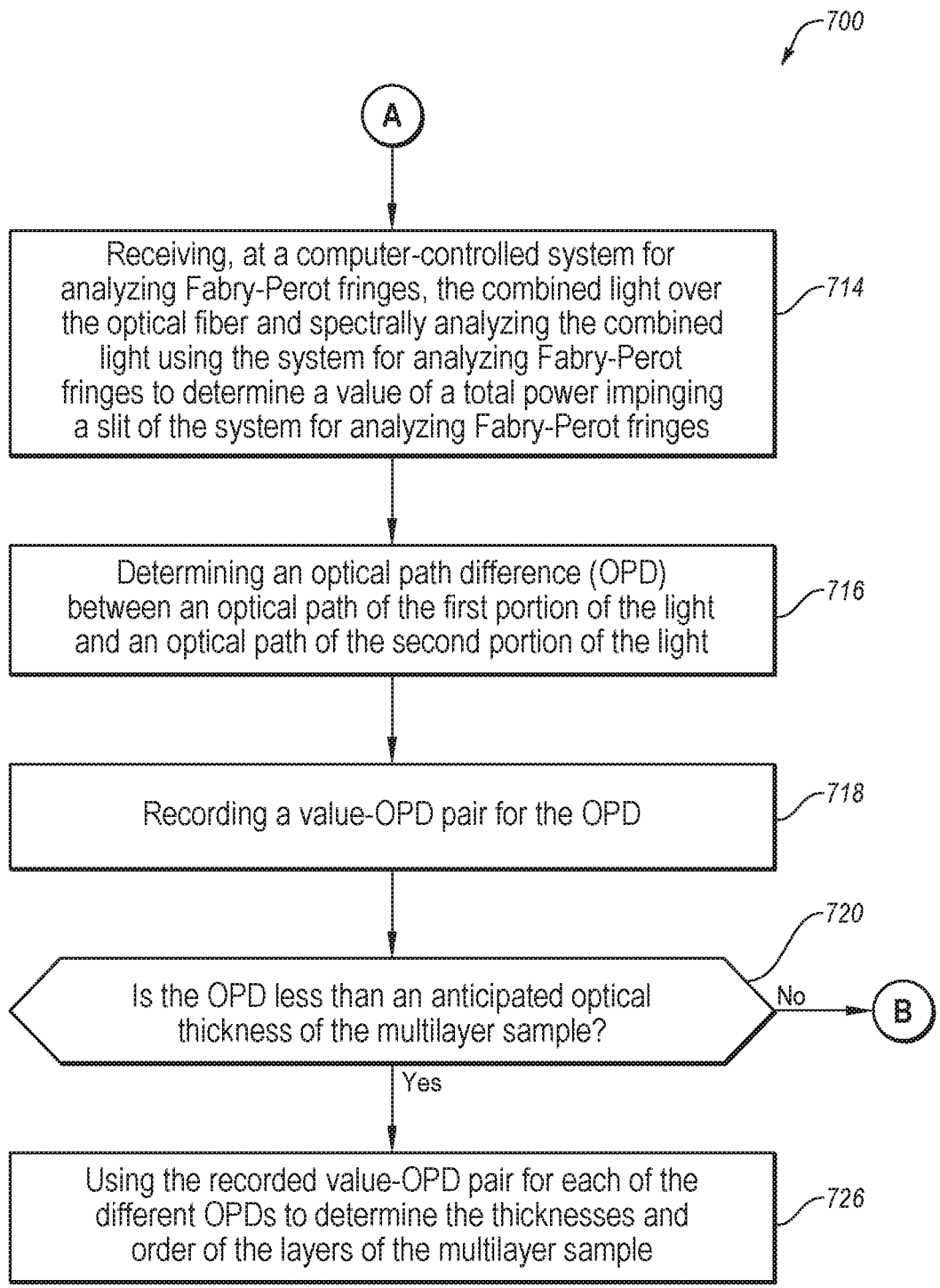
Figure 7C:
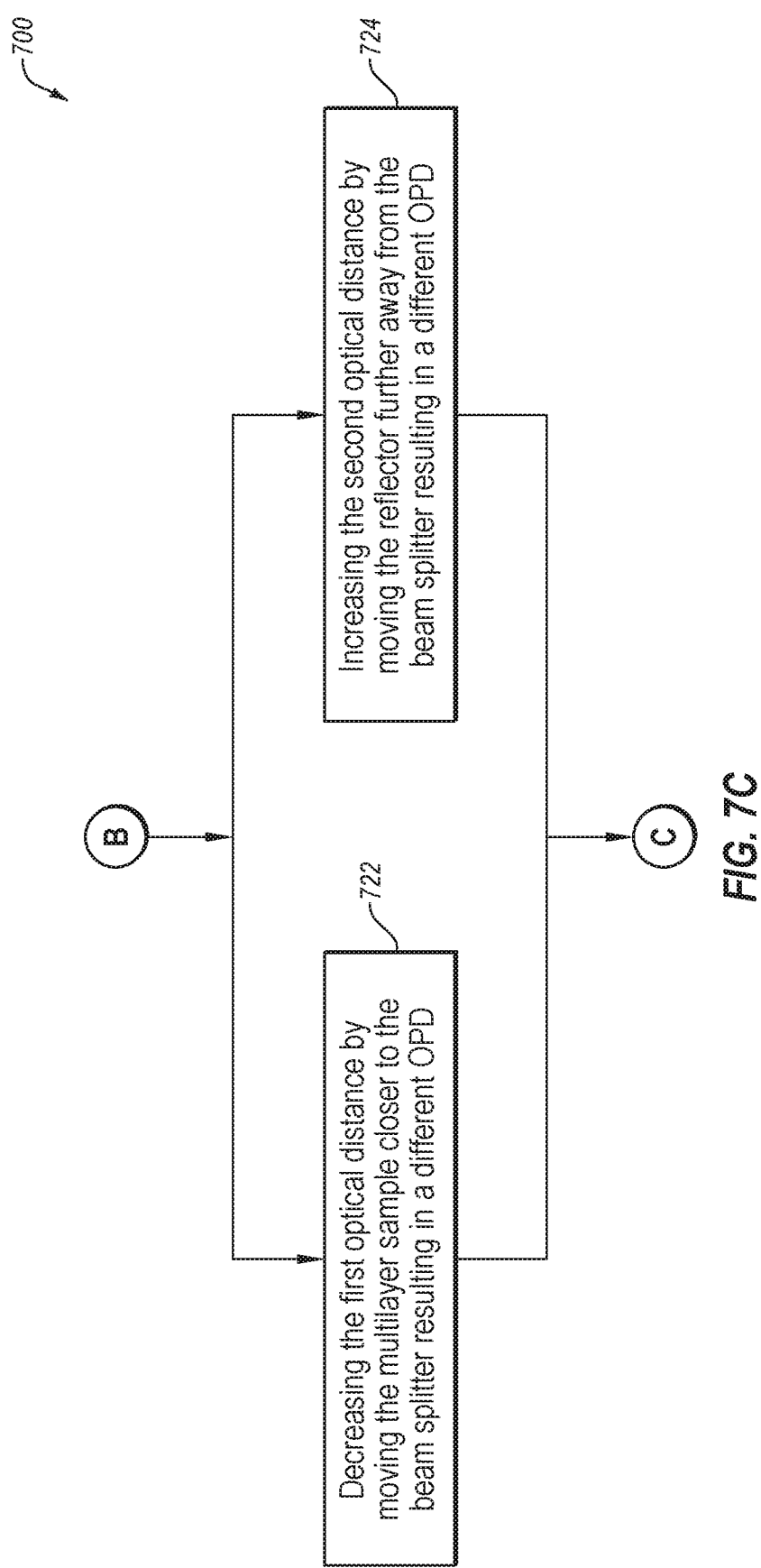

FIGS. 7A, 7B, and 7C illustrate a flowchart of an example method 700 for inspecting a multilayer sample, arranged in accordance with at least some embodiments described in this disclosure. The method 700 may be implemented, in some embodiments, by a system, such as any of the systems 100, 200, and 300 of FIGS. 1, 2, and 3, respectively. Although illustrated as discrete blocks, various blocks may be divided into additional blocks, combined into fewer blocks, or eliminated, depending on the desired implementation.

With reference to FIG. 7A, block 702 may include emitting, from a broadband light source, light over single mode optical fiber. For example, the broadband light source 112 of FIG. 2 may emit, at block 702, light over the single mode optical fiber 102.

Block 704 may include receiving, at a beam splitter, the light and splitting, at the beam splitter, the light into first and second portions. For example, the beam splitter/directing element 115 of FIG. 2 may receive, at block 704, the light over the single mode optical fiber 102 and may split the light into first and second portions.

The block 706 may include directing, from the beam splitter, the first portion of the light toward a multilayer sample positioned a first optical distance from the beam splitter. For example, the beam splitter/directing element 115 of FIG. 2 may direct, at block 706, the first portion of the light over the optical fiber 106 toward the multilayer sample 500 positioned a first optical distance D1 from the beam splitter/directing element 115.

The block 708 may include directing, from the beam splitter, the second portion of the light onto a reflector positioned a second optical distance from the beam splitter. For example, the beam splitter/directing element 115 of FIG. 2 may direct, at block 708, the second portion of the light over the optical fiber 108 onto the reflector 116 positioned a second optical distance D2 from the beam splitter/directing element 115.

The block 710 may include combining, at the beam splitter, the first portion of the light after being reflected from the multilayer sample and the second portion of the light after being reflected from the reflector. For example, the beam splitter/directing element 115 of FIG. 2 may combine, at block 710, the first portion of the light after being reflected from the multilayer sample 500 and the second portion of the light after being reflected from the reflector 116.

The block 712 may include directing, from the beam splitter, the combined light over the optical fiber. For example, the beam splitter/directing element 115 of FIG. 2 may direct, at block 712, the combined light over the optical fiber 110.

With reference to FIG. 7B, the block 714 may include receiving, at a computer-controlled system for analyzing Fabry-Perot fringes, the combined light over the optical fiber and spectrally analyzing the combined light at using the system for analyzing Fabry-Perot fringes to determine a value of a total power impinging a slit of the system for analyzing Fabry-Perot fringes. For example, the system 118 for analyzing Fabry-Perot fringes of FIG. 2 may receive, at block 714, the combined light over the optical fiber 110 and spectrally analyze the combined light to determine a value of a total power impinging a slit of the system 110 for analyzing Fabry-Perot fringes. In some embodiments, the spectrally analysis may be performed over all channels of the system for analyzing Fabry-Perot fringes.

The block 716 may include determining an optical path difference (OPD) between an optical path of the first portion of the light and an optical path of the second portion of the light. For example, the computer 120 of FIG. 2 may determine, at block 716, an optical path difference (OPD) between an optical path of the first portion of the light and an optical path of the second portion of the light.

The block 718 may include recording an interferogram that plots the value versus the OPD for the OPD. For example, the computer 120 of FIG. 2 may record, at block 716, an interferogram that plots the value versus the OPD for the OPD.

The decision block 720 may include determining whether the OPD is less than an anticipated optical thickness of the multilayer sample. If so (Yes at the decision block 720), the method may conclude with block 726. If not (No at decision block 720), the method may continue with either block 722 or block 724 and then return to block 702.

With reference to FIG. 7C, the block 722 may include decreasing the first optical distance by moving the multilayer sample closer to the beam splitter resulting in a different OPD. For example, the computer 120 of FIG. 2 may decrease, at block 722, the first optical distance D1 moving the multilayer sample 500, using a motion stage for example, closer to the beam splitter/directing element 115 resulting in a different OPD. In some embodiments, the first optical distance may be decreased at block 722 by an increment smaller than half of a wavelength of the first portion of the light.

The block 724 may include increasing the second optical distance by moving the reflector further away from the beam splitter resulting in a different OPD. For example, the computer 120 of FIG. 2 may increase, at block 724, the second optical distance D2 by moving the reflector 116, using a motion stage for example, further away from the beam splitter/directing element 115 resulting in a different OPD. In some embodiments, the second optical distance may be increased at block 724 by an increment smaller than half of a wavelength of the first portion of the light.

After a different OPD has been achieved in block 722 or block 724, the method may return to block 702 and repeat blocks 702-720 with the different OPD. This process may be iteratively repeated until the OPD is less than an anticipated optical thickness of the multilayer sample, at which point the method may continue to block 726.

With reference to FIG. 7A, the block 726 may include using the recorded interferogram for each of the different OPDs to determine the thicknesses and order of the layers of the multilayer sample. For example, the computer 120 of FIG. 2 may use, at block 7264, the recorded interferogram for each of the different OPDs to determine the thicknesses and order of the layers of the multilayer sample 500. In this example, the computer 120 of FIG. 2 may determine that the top layer of the multilayer sample 500 is the silicon dioxide layer with a thickness of 10 microns (see FIG. 5A), and the bottom layer of the multilayer sample 500 is the silicon layer with a thickness of 120 microns (see FIG. 5A).

One skilled in the art will appreciate that, for this and other methods disclosed in this disclosure, the blocks of the methods may be implemented in differing order. Furthermore, the blocks are only provided as examples, and some of the blocks may be optional, combined into fewer blocks, or expanded into additional blocks.

For example, in some embodiments, an additional block may be included in the method 700 that includes positioning the multilayer sample so that the first optical distance is shorter than the second optical distance by more than a coherence of the light emitted by the broadband light source. For example, the multilayer sample 500 of FIG. 2 may be positioned prior to block 702 so that the first optical distance D1 is shorter than the second optical distance D2 by more than a coherence of the light emitted by the broadband light source 112.

Further, in some embodiments, an additional block may be included in the method 700 that includes positioning the multilayer sample so that the first optical distance is longer than the second optical distance by more than a coherence of the light emitted by the broadband light source. For example, the multilayer sample 500 of FIG. 2 may be positioned prior to block 702 so that the first optical distance D1 is longer than the second optical distance D2 by more than a coherence of the light emitted by the broadband light source 112.

Terms used in this disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in this disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The invention claimed is:

1. A method for inspecting a multilayer sample, the method comprising:
   (b) emitting light from a broadband light source;
   (c) receiving, at a beam splitter, the light and splitting, at the beam splitter, the light into first and second portions;
   (d) directing, from the beam splitter, the first portion of the light toward a multilayer sample positioned a first optical distance from the beam splitter;
   (e) directing, from the beam splitter, the second portion of the light onto a reflector positioned a second optical distance from the beam splitter;
   (f) combining, at the beam splitter, the first portion of the light after being reflected from the multilayer sample and the second portion of the light after being reflected from the reflector;
   (g) directing, from the beam splitter, the combined light toward a system for analyzing Fabry-Perot fringes;
   (h) receiving, at a computer-controlled spectrograph included in the system for analyzing Fabry-Perot fringes, the combined light and spectrally analyzing the combined light using the computer-controlled spectrograph to determine a value of a total power impinging a slit of the system for analyzing Fabry-Perot fringes;
   (i) determining an optical path difference (OPD) between an optical path of the first portion of the light and an optical path of the second portion of the light;

(j) recording a Fabry-Perot interferogram for the OPD based on the determined value;

(k) directing, from the beam splitter, the combined light toward a computer-controlled point detector;

(l) recording, by the point detector, a Michelson interferogram for the OPD based on the combined light received at the point detector;

(m) performing (b)-(l) one or more additional times after decreasing the first optical distance by moving the multilayer sample closer to the beam splitter resulting in a different OPD; and (n) determining the thicknesses, compositions, orientations, and order of the layers of the multilayer sample based on a combined analysis of the Fabry-Perot interferograms and the Michelson interferograms for each of the different OPDs.

2. The method of claim 1, further comprising:

(b1) receiving, at a directional element, the light from the broadband light source and directing, from the directional element, the light to the beam splitter; and (b2) the method further comprises receiving, at the directional element, the combined light from the beam splitter and directing, from the directional element, the combined light to using the system for analyzing Fabry-Perot fringes.

3. The method of claim 1, further comprising:

(a) positioning the multilayer sample so that the first optical distance is shorter than the second optical distance by more than a coherence of the light emitted by the broadband light source at (b).

4. The method of claim 1, wherein the spectrally analyzing of the combined light at the system for analyzing Fabry-Perot fringes at (h) is performed over all channels of the system for analyzing Fabry-Perot fringes.

5. The method of claim 1, wherein the first optical distance is decreased at (m) by an increment smaller than half of a wavelength of the first portion of the light.

6. The method of claim 5, wherein (b)-(l) are performed at (m) until the OPD is less than an anticipated optical thickness of the multilayer sample.

7. The method of claim 1, wherein the system for analyzing Fabry-Perot fringes includes a computer-controlled etalon filter configured to filter the combined light and direct the filtered combined light toward the computer-controlled spectrograph via a single-mode optical fiber of the system for analyzing Fabry-Perot fringes.

8. A method for inspecting a multilayer sample, the method comprising:

(b) emitting light from a broadband light source;

(c) receiving, at a beam splitter, the light and splitting, at the beam splitter, the light into first and second portions;

(d) directing, from the beam splitter, the first portion of the light toward a multilayer sample positioned a first optical distance from the beam splitter;

(e) directing, from the beam splitter, the second portion of the light onto a reflector positioned a second optical distance from the beam splitter;

(f) combining, at the beam splitter, the first portion of the light after being reflected from the multilayer sample and the second portion of the light after being reflected from the reflector;

(g) directing, from the beam splitter, the combined light over a first single-mode optical fiber toward a system for analyzing Fabry-Perot fringes;

(h) receiving, at the system for analyzing Fabry-Perot fringes, the combined light directing the combined light over a second single-mode optical fiber, receiving at a computer-controlled spectrograph included in the system for analyzing Fabry-Perot fringes, the combined light over the second single-mode optical fiber-fiber, and spectrally analyzing the combined light using the computer-controlled spectrograph to determine a value of a total power impinging a slit of the system for analyzing Fabry-Perot fringes;

(i) determining an optical path difference (OPD) between an optical path of the first portion of the light and an optical path of the second portion of the light;

(j) recording a Fabry-Perot interferogram for the OPD based on the determined value;

(k) directing, from the beam splitter, the combined light toward a computer-controlled point detector;

(l) recording a Michelson interferogram for the OPD based on the combined light received at the point detector;

(m) performing (b)-(l) one or more additional times after increasing the second optical distance by moving the reflector further away from the beam splitter resulting in a different OPD; and (n) determining the thicknesses, compositions, orientations, and order of the layers of the multilayer sample based on a combined analysis of the Fabry-Perot interferograms and the Michelson interferograms for each of the different OPDs.

9. The method of claim 8, further comprising:

(b1) receiving, at a directional element, the light from the broadband light source and directing, from the directional element, the light to the beam splitter; and (b2) the method further comprises receiving, at the directional element, the combined light from the beam splitter and directing, from the directional element, the combined light to the system for analyzing Fabry-Perot fringes.

10. The method of claim 8, further comprising:

(a) positioning the multilayer sample so that the first optical distance is longer than the second optical distance by more than a coherence of the light emitted by the broadband light source at (b).

11. The method of claim 8, wherein the spectrally analyzing of the combined light at the system for analyzing Fabry-Perot fringes at (h) is performed over all channels of the system for analyzing Fabry-Perot fringes.

12. The method of claim 8, wherein the second optical distance is increased at (m) by an increment smaller than half of a wavelength of the first portion of the light.

13. The method of claim 12, wherein (b)-(l) are performed at (m) until the OPD is less than an anticipated optical thickness of the multilayer sample.

14. The method of claim 8, wherein the system for analyzing Fabry-Perot fringes includes a computer-controlled etalon filter configured to filter the combined light and direct the filtered combined light toward the computer-controlled spectrograph over the second single-mode optical fiber.

15. A system for inspecting a multilayer sample, the system comprising:

a broadband light source configured to emit light;

a beam splitter configured to receive the light from the broadband light source and split the light into first and second portions, direct the first portion of the light toward a multilayer sample positioned a first optical distance from the beam splitter, direct the second portion of the light onto a reflector positioned a second optical distance from the beam splitter, combine the first portion of the light after being reflected from the multilayer sample and the second portion of the light after being reflected from the reflector, and direct the combined light toward an optical switch;

the optical switch configured to switch between directing the combined light toward a system for analyzing Fabry-Perot fringes and a computer-controlled point detector;

the system for analyzing Fabry-Perot fringes configured to receive the combined light direct the combined light over a single-mode optical fiber of the system for analyzing Fabry-Perot fringes, receive, at a computer-controlled spectrograph included in the system for analyzing Fabry-Perot fringes, the combined light over the single-mode optical fiber, and spectrally analyze the combined light, using the computer-controlled spectrograph, to measure a value of a total power impinging a slit of the system for analyzing Fabry-Perot fringes;

a motion stage configured to decrease the first optical distance by moving the multilayer sample closer to the beam splitter or increase the second optical distance by moving the reflector further away from the beam splitter;

the computer-controlled point detector configured to receive the combined light and detect a Michelson interferogram based on the received combined light; and a computer configured to:
control the system for analyzing Fabry-Perot fringes, control the point detector,
determine an optical path difference (OPD) between an optical path of the first portion of the light and an optical path of the second portion of the light,
record a Fabry-Perot interferogram for each unique OPD based on the value,
record the Michelson interferogram detected by the point detector,
control the motion stage between measurements to change the OPD, and
determine the thicknesses, compositions, orientations, and order of the layers of the multilayer sample based on the Fabry-Perot interferograms and the Michelson interferograms for each of the different OPDs.

16. The system of claim 15, further comprising:
a directional element configured to receive the light from the broadband light source, direct the light to the beam splitter, receive the combined light from the beam splitter, and direct the combined light to the optical switch.

17. The system of claim 15, wherein the system for analyzing Fabry-Perot fringes is configured to spectrally analyze the combined light over all channels of the system for analyzing Fabry-Perot fringes.

18. The system of claim 15, wherein the computer is configured to control the motion stage between measurements to only change the OPD by an increment smaller than half of a wavelength of the first portion of the light.

19. The system of claim 18, wherein computer is configured to control the motion stage between measurements to change the OPD only until the OPD is less than an anticipated optical thickness of the multilayer sample.

* * * * *